US011766892B2

(12) United States Patent
Papakonstantopoulos et al.

(10) Patent No.: US 11,766,892 B2
(45) Date of Patent: Sep. 26, 2023

(54) TIRE TREAD FORMULATION

(71) Applicant: THE GOODYEAR TIRE & RUBBER COMPANY, Akron, OH (US)

(72) Inventors: George Jim Papakonstantopoulos, Medina, OH (US); Brad Stephen Gulas, Fairlawn, OH (US); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 94 days.

(21) Appl. No.: 17/548,699

(22) Filed: Dec. 13, 2021

(65) Prior Publication Data
US 2022/0194127 A1   Jun. 23, 2022

Related U.S. Application Data

(60) Provisional application No. 63/127,417, filed on Dec. 18, 2020.

(51) Int. Cl.
| | |
|---|---|
| *C08L 9/06* | (2006.01) |
| *B60C 1/00* | (2006.01) |
| *B60C 11/00* | (2006.01) |
| *C08K 3/04* | (2006.01) |
| *C08K 3/36* | (2006.01) |
| *C08K 9/06* | (2006.01) |
| *C08L 91/00* | (2006.01) |

(52) U.S. Cl.
CPC .............. *B60C 1/0016* (2013.01); *C08K 3/04* (2013.01); *C08K 3/36* (2013.01); *C08K 9/06* (2013.01); *C08L 9/06* (2013.01); *C08L 91/00* (2013.01); *C08K 2201/006* (2013.01); *C08L 2205/025* (2013.01); *C08L 2205/03* (2013.01)

(58) Field of Classification Search
CPC ... C08L 9/06; C08L 91/00; B60C 1/00; B60C 11/00; C08K 3/04; C08K 3/36; C08K 9/06

USPC ........................................................ 523/156
See application file for complete search history.

(56) References Cited

U.S. PATENT DOCUMENTS

| | | | |
|---|---|---|---|
| 7,919,553 B2 | 4/2011 | Kawasaki et al. | |
| 8,022,136 B2 | 9/2011 | Yano et al. | |
| 8,044,118 B2 | 10/2011 | Sakaki et al. | |
| 8,100,157 B2 | 1/2012 | Hattori et al. | |
| 10,059,825 B2 | 8/2018 | Harris et al. | |
| 2017/0355836 A1 | 12/2017 | Yokoyama | |
| 2020/0062878 A1 | 2/2020 | Thomas et al. | |

FOREIGN PATENT DOCUMENTS

| | | | | |
|---|---|---|---|---|
| EP | 942042 A2 * | 9/1999 | ........... | B60C 1/0016 |
| EP | 3135712 A1 | 3/2017 | | |
| EP | 3251872 B1 | 3/2019 | | |
| EP | 3470458 A1 | 4/2019 | | |
| JP | 5647172 A1 | 12/2014 | | |

OTHER PUBLICATIONS

Extended European Search Report dated Apr. 21, 2022 for European Patent Application No. 21212509.0 which is the European counterpart to the subject patent application.

* cited by examiner

*Primary Examiner* — Deve V Hall
(74) *Attorney, Agent, or Firm* — Alvin T. Rockhill

(57) ABSTRACT

This invention is based upon the unexpected discovery that silica containing tire tread rubber performance characteristics, such as hysteresis and payne effect, can be significantly improved using low levels of coupling agents and increasing silanization times and temperatures. The rubbers formulations made in accordance with this finding are of particular value for use in the treads of winter tires. Such rubber formulations will typically be made using a maximum level of about 7 phf of silica coupling agent and will more typically contain 3 phf to 6 phf of the silica coupling. A silanization time of at least 4 minutes or 5 minutes (within the range of 4 to 10 minutes) at a temperature of at least 150° C. and preferably 160° C. (within the range of 150° C. to 180° C.) will also be used.

20 Claims, No Drawings

TIRE TREAD FORMULATION

This application claims benefit of U.S. Provisional Patent Application Ser. No. 63/127,417 filed on Dec. 18, 2020. The teachings of U.S. Provisional Patent Application Ser. No. 63/127,417 are incorporated herein by reference in their entirety.

FIELD OF THE INVENTION

This invention relates to a tire tread formulation which provides good cold weather performance characteristics as well as excellent traction on wet, snow covered, and icy pavements. This tire tread formulation can beneficially be used in a wide variety of tires for various purposes, including all-season tires and winter tires, for automobiles and light trucks.

BACKGROUND OF THE INVENTION

Tires with treads that are designed for promoting traction on wet, snow covered, and icy surfaces are desirable for use under the driving conditions that can be encountered during the winter. It is, of course, also important for such tires to maintain desired performance characteristics at the low temperatures that can be experienced during harsh winter conditions while also being capable of performing well during more moderate conditions and in warm weather environments. For instance, all-weather tires must be capable of providing good service during hot as well as cold weather. On the other hand, winter tires, such as snow tires, are designed specifically for uses during the conditions encountered during the winter and are typically used only during winter driving conditions.

Various rubber tire tread formulations have been proposed for use in snow tires, winter tires, and all-season tires. For example, tire tread rubber compositions which contain high molecular weight, diene based elastomers having high glass transition temperatures are commonly used for such purposes, particularly for wet traction (traction of tire treads on wet road surfaces). Such tire tread formulations also commonly include precipitated silica as reinforcing filler.

When such elastomers have a high uncured rubber viscosity (e.g. Mooney, ML1+4. 100° C., viscosity), petroleum based rubber processing oil may be blended with the elastomer(s) to reduce the rubber composition's uncured viscosity and to thereby promote more desirable processing conditions for the uncured rubber composition. The petroleum based rubber processing oil can be added to the elastomer prior to its addition to an internal rubber mixer (e.g. a Banbury rubber mixer) or be added to the rubber composition in the mixer to reduce the viscosity of the rubber composition both in the internal rubber mixer and for subsequent rubber processing such as in a rubber extruder. It is normally challenging to reduce the cured stiffness of such tread rubber compositions, as indicated by having a lower storage modulus G' at about −20° C., when the tread is intended to be also useful for low temperature winter conditions, particularly in the case of snow tires. In any case, significant challenges are presented for providing such tire tread rubber compositions for maintaining wet traction while promoting low temperature (e.g. cold weather) performance.

To achieve such balance of tread rubber performance characteristics, it is proposed to evaluate providing a tread rubber composition containing a high Tg (glass transition temperature) elastomer together with an elastomer having a lower Tg to beneficially promote a lower stiffness of the cured rubber composition to improve cold weather performance of the tire tread, while substantially maintaining the wet traction capability of the tire tread.

For such challenge, it is proposed to evaluate providing a combination of high Tg and lower Tg styrene-butadiene elastomers together with a low Tg cis 1,4-polybutadiene rubber (PBd) with reinforcing filler comprised of precipitated silica, which may be a pre-hydrophobated precipitated silica, and rubber reinforcing carbon black.

To meet the challenge of providing good cold weather (winter) performance while maintaining wet traction for the tire tread, it is also desired to promote beneficial processability of the uncured rubber composition which contains the high Tg S-SBR by extending the S-SBR with vegetable oil instead of petroleum based rubber processing oil. Such vegetable oil extension of the S-SBR further promotes a beneficially lower cured stiffness of the tread rubber composition at lower temperatures to thereby further promote cold weather performance for the tire tread.

Vegetable triglyceride oil extension of the high Tg S-SBR is to be distinguished from free addition of the vegetable triglyceride oil to the high Tg S-SBR or to the rubber composition. By the term "extension" it is meant that the vegetable oil is added to a cement comprised of a composite of solvent solution of the high Tg S-SBR as a product of polymerization of styrene and 1,3-butadiene monomer in an organic solvent solution with a suitable catalyst to promote the polymerization, wherein the high Tg S-SBR is recovered from the cement as a composite of the high Tg S-SBR and vegetable triglyceride oil.

In one embodiment, the rubber composition may, if desired, also contain freely added vegetable triglyceride oil, in addition to vegetable triglyceride oil contained in the vegetable oil extended high Tg SBR, to further promote a lower rubber stiffness at lower temperatures for the tread rubber. By the term "freely added", it is meant that the vegetable oil is added to the rubber composition containing the S-SBR during its physical mixing of rubber and rubber compounding ingredients in contrast to the aforesaid "extending" of the high Tg S-SBR itself.

In one embodiment, to promote wet traction for such evaluation, without significantly detracting from the low temperature performance, it is desired to further evaluate providing at least one traction resin in the tread rubber composition.

Triglyceride oils, including vegetable oils, have previously been described for use in various rubber compositions, including rubber compositions for tire components (see U.S. Pat. Nos. 7,919,553, 8,100,157, 8,022,136, and U.S. Pat. No. 8,044,118. However, the use of vegetable oils as an extender oil for a high Tg S-SBR combined with a blend of lower Tg PBd and E-SBR elastomers together with precipitated silica reinforcement, which may be in a form of pre-hydrophobated precipitated silica, is believed to be novel and a significant departure from past practice to both aid in processing of the uncured rubber composition and to provide cured rubber composition for a tire tread to promote a combination of wet traction and low temperature cold weather performance.

SUMMARY OF THE INVENTION

This invention is based upon the unexpected discovery that silica containing tire tread rubber performance characteristics, such as hysteresis and payne effect, can be significantly improved by reducing standard levels of coupling agents and increasing silanization times and temperatures.

The rubbers formulations made in accordance with this finding are of particular value for use in the treads of winter tires. Such rubber formulations will typically be made with a maximum of about 7 phf of silica coupling agent and will more typically contain 3 phf to 6 phf of the silica coupling agent with levels which are within the range of 4 phf to 5 phr being preferred. A silanization time of at least 4 minutes or 5 minutes (within the range of 4 to 10 minutes) at a temperature of at least 150° C. and preferably 160° C. (within the range of 150° C. to 180° C.) will also be used.

Thus invention more specifically reveals a tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of (1) about 10 phr to about 70 phr of a solution styrene-butadiene rubber having a glass transition temperature which is within the range of from about −85° C. to about −20° C., a bound styrene content which is within the range of from about 10 to about 40 percent, (2) about 0 phr to about 50 phr of emulsion styrene-butadiene rubber having a glass transition temperature which is within the range of from about −65° C. to about −45° C. and having a bound styrene content which is within the range of 15 to about 30 percent, and (3) about 20 phr to about 60 phr of cis 1,4-polybutadiene rubber having a cis 1,4-isometric content of at least about 95 percent and having a glass transition temperature which is within the range of −90° C. to −110° C.; wherein the tread includes 50 phr to 250 phr of a rubber reinforcing filler comprised of precipitated silica (amorphous synthetic precipitated silica) and from about 2 to about 10 phr rubber reinforcing carbon black, wherein said precipitated silica is treated with 3 phf to 6 phf of the silica coupling agent.

In one embodiment, said solution styrene-butadiene rubber is oil extended with from about 5 to 40 phr of vegetable triglyceride oil.

In one embodiment, said vegetable triglyceride oil is comprised of a combination of saturated and unsaturated esters where said unsaturated esters are comprised of a combination of at least one of oleic acid ester, linoleate acid ester and linoleate acid ester. Said saturated esters may be comprised of, for example and not intended to be limiting, at least one of stearic acid ester and palmitate acid ester. On one embodiment, said vegetable triglyceride oil is comprised of at least one of soybean oil, sunflower oil, rapeseed oil, canola oil, desirably soybean oil.

In one embodiment of this invention, the high Tg S-SBR desirably has a high molecular weight to thereby have an uncured Mooney viscosity (ML1+4) at 100° C., in a range of from about 50 to about 120. In another embodiment, the lower Tg E-SBR desirably is of a lower molecular weight than the S-SBR to thereby have an uncured Mooney viscosity (ML1+4), 100° C. in a range of from about 35 to about 50. In one embodiment, the cis-1,4-polybutadiene rubber has a cis 1,4-isomeric content of at least about 95 percent. It may, for example, have an uncured Mooney viscosity (ML1+4) at 100° C., in a range of from about 45 to about 55. In another embodiment, the tread rubber composition is desirably exclusive of functionalized elastomers (e.g. functionalized styrene/butadiene elastomers).

In one embodiment, the tread rubber composition may contain a functionalized elastomer (e.g. high Tg functionalized styrene/butadiene elastomer containing functional groups comprised of at least one of amine, siloxy, thiol and carboxyl groups reactive with hydroxyl groups contained on precipitated silica).

In one embodiment, said high Tg S-SBR (or said functionalized high Tg styrene/butadiene elastomer) may be, if desired, a tin or silicon coupled elastomer which would thereby increase its molecular weight and uncured Mooney viscosity.

In one embodiment, said traction promoting resin may be a terpene resin comprised of polymers of at least one of limonene, alpha pinene and beta pinene and having a softening point within a range of from about 60° C. to about 140° C. In one embodiment, said traction promoting resin may be a coumarone indene resin having a softening point in a range of from about 60° C. to about 150° C.

In one embodiment, said traction promoting resin may be a styrene-alphamethylstyrene resin having a softening point in a range of from about 60° C. to about 125° C., alternately from about 80° C. to 90° C. (ASTM E28), and, for example, a styrene content of from about 10 to about 30 percent.

The precipitated silica may, for example, have a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also have a dibutyl phthalate (DBP) absorption value, for example, in a range of about 100 to about 400, and more usually about 150 to about 300 cc/100 g. Representative of such pre-hydrophobated precipitated silica may be, for example, Agilon™ 400 from PPG.

Representative examples of rubber reinforcing carbon blacks are, for example, and not intended to be limiting, referenced in *The Vanderbilt Rubber Handbook*, 13$^{th}$ edition, 1990, on Pages 417 and 418 with their ASTM designations. Such rubber reinforcing carbon blacks may have iodine absorptions ranging from, for example, 60 to 240 g/kg and DBP values ranging from 34 to 150 cc/100 g.

Some representative examples of silica coupler that can be utilized in making the precipitated silica for use in accordance with this invention include:

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) combinations thereof.

A representative example of bis(3-trialkoxysilylalkyl) polysulfide is comprised of bis(3-triethoxysilylpropyl) polysulfide.

Said pre-hydrophobated precipitated silica is desirably a product of precipitated silica and an alkoxyorganomercaptosilane.

Said added precipitated silica (a non-hydrophobated precipitated silica) is desirably added to the rubber composition in combination with said bis(3-triethoxysilylpropyl) polysulfide for reaction thereof in situ within the rubber composition.

It is readily understood by those having skill in the art that the vulcanizable rubber composition would be compounded by methods generally known in the rubber compounding art. In addition, said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from about 1 to 6 phr being sometimes desired. Typical amounts of processing aids, if used, may comprise, for example, about 1 to about 10 phr.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include, for example, stearic, palmitic and oleic acids, particularly a mixture comprised thereof, in an amount, for example, ranging from about 0.5 to about 6 phr. Typical amounts of zinc oxide may comprise, for example, about 0.5 to about 5 phr. Typical amounts of waxes, if used, may comprise, for example, about 0.5 to about 5 phr. Such wax is often a microcrystalline wax. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 3, phr. In another embodiment, combinations of a primary and a secondary accelerator might be used with the secondary accelerator being used in amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as, for example, a diphenylguanidine or zinc dibenzyl dithiocarbamate.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to about 170° C. Any of the usual vulcanization processes may be used such as heating in a press or mold, heating with superheated steam or hot air. Such tires can be built, shaped, molded and cured by various methods which are known and will be readily apparent to those having skill in such art.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include less than 10 phr oil, preferably less than 5 phr.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 cm$^3$/100 g to 400 cm$^3$/100 g, alternatively 150 cm$^3$/100 g to 300 cm$^3$/100 g which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 phr and 120 phr, preferably in a range of between 20 phr and 70 phr or 80 phr to 120 phr. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

Representative examples of carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and DBP number ranging from 34 cm$^3$/100 g to 150 cm$^3$/100 g. Iodine absorption values can be suitably determined according to ASTM D1510 or equivalent.

In one embodiment, the rubber composition may contain also a conventional sulfur containing organosilicon compounds or silanes. Examples of suitable sulfur containing organosilicon compounds are of the formula:

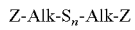    Z-Alk-S$_n$-Alk-Z    I in which Z is selected from the group consisting of

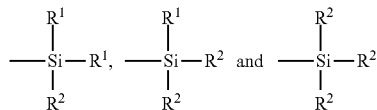

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

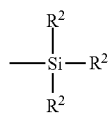

where R$^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 to 20 phr. In one embodiment, the amount will range from 1 to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment of this invention, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one non-productive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages or composition, respectively, are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect, the present invention is directed to a tire which is comprised of a cured rubber which is made by curing the productive rubber composition comprising sulfur and accelerator.

In another embodiment, the tire is a passenger car tire, truck tire, an agricultural tire or airplane tire.

The features of the above aspects and/or embodiments may be combined with one another.

DETAILED DESCRIPTION OF THE INVENTION

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr). The amount of coupling agent is expressed as parts of material per 100 parts of silica filler by weight (phf).

The glass transition temperature (Tg) of the solid elastomers may be determined by DSC (differential scanning calorimetry) measurements, as would be understood and well known by one having skill in such art. The softening point of a resin, where appropriate, may be determined by ASTM E28 which might sometimes be referred to as a ring and ball softening point.

The following examples are presented for the purposes of illustrating and not limiting the present invention. The parts and percentages are parts by weight, usually parts by weight per 100 parts by weight rubber (phr) unless otherwise indicated.

Examples 1-4

This series of experiments was carried out to evaluate the effect of the level of silica coupling agent and silanization temperature and time on cured rubber properties. This evaluation was performed in a typical rubber formulation which was compounded as follows:

| First Stage—Non-Productive Formulation | |
| --- | --- |
| Budene ® 1207 high cis-1,4-Polybutadiene Rubber | 30 phr |
| Functionalized Styrene-Butadiene Rubber | 70 phr |
| N330 Carbon Black | 3 phr |
| Microcrystalline Wax | 1 phr |
| Antioxidant | 2 phr |
| Stearic Acid | 5 phr |
| Naphthenic Procession Oil | 22 phr |
| Zeosil 1165 MP Silica | 54 phr |
| Second Stage—Non-Productive Formulation | |
| Resin | 5 phr |
| Antioxidant | 3.25 phr |
| Processing Oil | 10.5 phr |
| Zeosil 1165 MP Silica | 36 phr |
| Coupling Agent | |
| Productive Formulation | |
| Zinc Oxide | 1.75 phr |
| Sulfur | 1.3 phr |
| CBS Accelerator | 2.25 phr |
| Diphenyl Guanidine | |

The Si266 silica coupling agent was evaluated at 10 phf and 5 phf concentrations and the effect of heat treatment at these levels was probed with a 2 minute heat treatment (temperature tempering) at 160° C. and 5 minutes at 170° C. at the second stage where the coupling agent is introduced. The diphenyl guanidine loading was chosen on the basis of prior experience. All samples in this study were cured for testing for 10 minutes at 170° C. except for the standard RPA protocols. The specifics of these experiments are reported in Table 1.

TABLE 1

| Parameters Evaluated in this Series of Experiments | | | | |
| --- | --- | --- | --- | --- |
| Example | 1 | 2 | 3 | 4 |
| Heat Treatment | 2 min @ 160° C. | 5 min @ 170° C. | 2 min @ 160° C. | 5 min @ 170° C. |
| Si266 SCA[1] | 10 phf | 10 phf | 5 phf | 5 phf |
| Diphenyl Guanidine | 2.5 phr | 2.5 phr | 3.2 phr | 3.2 phr |

[1]Si 266 silica coupling agent

The tensile properties of the rubber samples made in this series of experiments are reported in Table 2.

TABLE 2

Tensile Properties

| Example | 1 | 2 | 3 | 4 |
|---|---|---|---|---|
| 100% Modulus | 2.4 MPa | 2.3 MPa | 1.9 MPa | 1.8 MPa |
| 300% Modulus | 9.9 MPa | 11.3 MPa | 7.9 MPa | 8.8 NPa |
| Tensile Strength | 16.5 MPa | 17.5 MPa | 17.4 MPa | 16.0 MPa |
| Elongation @ Break | 437% | 410% | 544% | 450% |

As can been seen from Table 2, it is clear that the utilization of a reduced amount of coupling agent, which should result in a reduction in polymer-filler interaction, presents itself as a reduction in the stiffness values (100% and 300% modulus). Increasing the heat treatment for both levels of coupling agents should allow for silane condensation to progress which presents itself as a reduction of the elongation at break and in turn increases modulus at 300%. The tensile strength of all the compounds evaluated is within margins of experimental error.

Dynamic mechanical analysis (DMA) testing was performed and the results of this testing is provided in Table 3 It is clear that the longer heat treatment decreased the tan δ values significantly while stiffness also was decreased. The changes are larger for the 5 phf samples than for the 10 phf samples. Just as an illustrative example, the stiffness at −20° C. for the 5 phf sample decreased by about 40% while for the 10 phf it only decreased by about 20%. From these results it is clear that the degree of heat treatment can have a different effect on the properties of a compound using different concentrations of coupling agents. Depending on the tire application and the final compound properties a combination of a set coupling agent level and heat treatment level can be found more beneficial.

TABLE 3

DMA Testing Results

| SAMPLE | | 10phf 2m160 | 10phf 5m170 | Change | 5phf 2m160 | 5phf 5m170 | Change |
|---|---|---|---|---|---|---|---|
| TD @ 0° C. | | 0.432 | 0.404 | −6.5% | 0.423 | 0.355 | −16.2% |
| TD @ 10° C. | | 0.350 | 0.301 | −14.1% | 0.331 | 0.246 | −25.6% |
| TD @ 30° C. | | 0.268 | 0.193 | −27.7% | 0.244 | 0.161 | −34.0% |
| TD @ 60° C. | | 0.211 | 0.132 | −37.4% | 0.199 | 0.122 | −38.8% |
| G' @ −20° C. | Pa | 1.49E+07 | 1.21E+07 | −19.2% | 1.27E+07 | 7.64E+06 | −39.8% |
| G' @ 0° C. | Pa | 5.8E+06 | 4.3E+06 | −25.1% | 5.2E+06 | 2.9E+06 | −44.5% |
| G' @ 10° C. | Pa | 4.7E+06 | 3.4E+06 | −26.0% | 4.3E+06 | 2.4E+06 | −43.4% |
| G' @ 30° C. | Pa | 3.6E+06 | 2.6E+06 | −26.3% | 3.4E+06 | 2.0E+06 | −41.8% |

Rebound testing was also performed for these compounds and is reported in Table 4. The effect of heat treatment on the compound properties was clear again with a significant increase of the rebound values for longer heat treatments.

TABLE 4

Rebound Value Testing Results

| SAMPLE | 10phf 2m160 | 10phf 5m170 | Change | 5phf 2m160 | 5phf 5m170 | Change |
|---|---|---|---|---|---|---|
| 0° C. | 20.3 | 22.8 | 12.2% | 22.6 | 24.2 | 7.1% |
| 23° C. | 38.1 | 44.2 | 16.0% | 39.7 | 47.7 | 20.0% |
| 60° C. | 54.2 | 60.6 | 11.7% | 52.4 | 58.7 | 12.0% |
| 100° C. | 63.3 | 69.4 | 9.7% | 61.3 | 67.4 | 10.1% |

As shown in Table 5, abrasion testing for these compounds showed that increasing heat treatment did slightly improve the abrasion resistance of the compounds. However, the changes between the 5 phf and 10 phf samples were similar.

TABLE 5

Grosch Abrasion Value Testing

| SAMPLE | | 10phf 2m160 | 10phf 5m170 | Change | 5phf 2m160 | 5phf 5m170 | Change |
|---|---|---|---|---|---|---|---|
| ABRAS RATE HIGH (meas) | mg/km | 498 | 464 | −6.8% | 576 | 543 | −5.7% |
| ABRASION RATING HIGH | % | 100 | 107 | 7.0% | 86 | 91 | 5.8% |

RPA was also performed for the samples. As can be seen, the stiffness of the compounds decreased with the increase in the heat treatment and the hysteresis dropped as well. The degree that the properties changed however varied once again demonstrating that the level of heat treatment can affect compounds of different coupling agent loading to a different extent.

TABLE 6

RPA Testing

| SAMPLE | | 10phf 2m160 | 10phf 5m170 | Change | 5phf 2m160 | 5phf 5m170 | Change |
|---|---|---|---|---|---|---|---|
| G' (1%;45C) | MPa | 2.3 | 2.2 | −6.0% | 4.3 | 2.9 | −32.8% |
| G' (10%;45C) | MPa | 1.5 | 1.4 | −8.6% | 1.7 | 1.6 | −9.6% |
| TD (1%;45C) | | 0.195 | 0.121 | −37.9% | 0.141 | 0.117 | −17.0% |
| TD (10%;45C) | | 0.19 | 0.146 | −23.2% | 0.201 | 0.16 | −20.4% |

The results of MDR testing is provided in Table 7. As can be seen the delta torque values decrease as heat treatment increases but for the same level of heat treatment the values are comparable for the two different coupling agent loadings. T90 decreases as heat treatment increases but for the longer heat treatment level, they are similar and in fact for the 5 phf sample the change is minimal.

TABLE 7

MDR for evaluated samples

| SAMPLE | | 10 phf 2 m 160 | 10 phf 5 m 170 | 5 phf 2 m 160 | 5 phf 5 m 170 |
|---|---|---|---|---|---|
| DELTA TORQUE | dN · m | 17.0 | 13.5 | 17.1 | 13.3 |
| T90 | min | 14.0 | 10.1 | 11.1 | 10.7 |

These examples show the effect of the level of heat treatment in varying loading of silica coupling agents in standard rubber formulation. From this study, it is apparent that the optimum level of coupling agent highly depends on the heat treatment that a compound experiences. In fact, it is clear that in certain specific tire applications, a combination of lower coupling agent level with longer heat treatment protocol provides performance benefits.

While certain representative embodiments and details have been shown for the purpose of illustrating the subject invention, it will be apparent to those skilled in this art that various changes and modifications can be made therein without departing from the scope of the subject invention.

What is claimed is:

1. A tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of (1) about 10 phr to about 70 phr of a solution styrene-butadiene rubber having a glass transition temperature which is within the range of from about −85° C. to about −20° C., a bound styrene content which is within the range of from about 10 to about 40 percent,; (2) about 0 phr to about 50 phr of emulsion styrene-butadiene rubber having a glass transition temperature which is within the range of from about −65° C. to about −45° C. and having a bound styrene content which is within the range of 15 to about 30 percent, and (3) about 20 phr to about 60 phr of cis-1,4-polybutadiene rubber having a cis-1,4-microstructure content of at least 95 percent and having a glass transition temperature which is within the range of −90° C. to −110° C.; (4) 50 phr to 250 phr of an amorphous synthetic precipitated silica; and (5) from 2 phr to about 10 phr rubber reinforcing carbon black, wherein said precipitated silica is treated with 3 phf to 6 phf of a silica coupling agent.

2. The tire of claim 1 wherein the precipitated silica is treated with 3 phf to 5 phf of the silica coupling agent.

3. The tire of claim 1 wherein the precipitated silica is treated with 4 phf to 5 phf of the silica coupling agent.

4. The tire of claim 1 wherein the precipitated silica is treated with the silica coupling agent for a silanization time of at least 4 minutes.

5. The tire of claim 1 wherein the precipitated silica is treated with the silica coupling agent for a silanization time of at least 5 minutes.

6. The tire of claim 4 wherein the precipitated silica is treated with the silica coupling agent for a silanization time of 4 minutes to 7 minutes.

7. The tire of claim 4 wherein the precipitated silica is treated with the silica coupling agent for a silanization time of 5 minutes to 7 minutes.

8. The tire of claim 4 wherein the silanization temperature is at least 160° C.

9. The tire of claim 4 wherein the silanization temperature is at least 170° C.

10. The tire of claim 5 wherein the silanization temperature is at least 150° C.

11. The tire of claim 4 wherein the silanization temperature is within the range of 150° C. to 180° C.

12. The tire of claim 1, wherein the vegetable triglyceride oil is selected from the group consisting of soybean oil, sunflower oil, rapeseed oil, and canola oil.

13. The tire of claim 1 wherein said styrene-butadiene rubber is oil extended with from about 5 to about 40 phr of vegetable triglyceride oil.

14. The tire of claim 1 wherein said styrene-butadiene rubber contains functionalized groups capable of reacting with the reinforcing filler.

15. The tire of claim 13, wherein the vegetable triglyceride oil is selected from the group consisting of soybean oil, sunflower oil, rapeseed oil, and canola oil.

16. The tire of claim 13 wherein the vegetable triglyceride oil is selected from the group consisting of soybean oil, sunflower oil, rapeseed oil, canola oil, desirably soybean oil.

17. The tire of claim 12 wherein the vegetable triglyceride oil is soybean oil.

18. The tire of claim 13 wherein the vegetable triglyceride oil is soybean oil.

19. The tire of claim 1 wherein the precipitated silica has a BET surface area, as measured using nitrogen gas, which is within the range of about 40 to about 600.

20. The tire of claim 1 wherein the precipitated silica has a dibutyl phthalate absorption value which is within the range of about 100 to about 400 cc/100 g.

* * * * *